United States Patent
Srivastava et al.

(10) Patent No.: US 8,531,098 B2
(45) Date of Patent: Sep. 10, 2013

(54) PHOSPHOR BLENDS FOR FLUORESCENT LAMPS

(75) Inventors: Alok Mani Srivastava, Niskayuna, NY (US); Holly Ann Comanzo, Niskayuna, NY (US); Samuel Joseph Camardello, Albany, NY (US)

(73) Assignee: General Electric Company, Niskayuna, NY (US)

( * ) Notice: Subject to any disclaimer, the term of this patent is extended or adjusted under 35 U.S.C. 154(b) by 125 days.

(21) Appl. No.: 13/306,414

(22) Filed: Nov. 29, 2011

(65) Prior Publication Data

US 2013/0134863 A1   May 30, 2013

(51) Int. Cl.
   *H01J 1/62* (2006.01)
(52) U.S. Cl.
   USPC .................................. 313/487; 252/301.4 R
(58) Field of Classification Search
   USPC ............ 313/484–487; 252/301.4 R, 301.6 P, 252/301.4 F
   See application file for complete search history.

(56) References Cited

U.S. PATENT DOCUMENTS

| | | | |
|---|---|---|---|
| 3,407,139 A | 10/1968 | Brown, Jr. | |
| 3,632,522 A | 1/1972 | McAllister | |
| 4,772,417 A | 9/1988 | Pappalardo et al. | |
| 4,888,635 A * | 12/1989 | Harada et al. | 358/509 |
| 5,801,483 A * | 9/1998 | Watanabe et al. | 313/485 |
| 5,838,101 A | 11/1998 | Pappalardo | |
| 7,859,006 B2 | 12/2010 | Kato et al. | |
| 2005/0156503 A1 | 7/2005 | Manivannan et al. | |
| 2007/0052340 A1 | 3/2007 | Kop et al. | |
| 2009/0174310 A1 | 7/2009 | Vogt et al. | |
| 2010/0102704 A1 | 4/2010 | Jermann et al. | |
| 2011/0043099 A1 | 2/2011 | Duan et al. | |

FOREIGN PATENT DOCUMENTS

GB 746273 A 3/1956

OTHER PUBLICATIONS

D.E. Kinney; Modified Calcium Pyrophosphate Phosphors; Journal of the Electrochemical Society; Dec. 1955; pp. 676-681.
Fabien Boitier et al.; Enhancement of Mn red emission in CaGa2S4 compounds by co-doping rare-earth elements Journal of Luminescence 129(2009) 554-562.
C.W.W. Hoffman et al.; Compound Formation and Mn2+-Activated Luminescence in the Binary Systems R2O- and RO-Ga2O3; J. inorg, nucl. Chem., 1968, vol. 30, pp. 63 to 79. Pergamon Press Ltd. Printed in Great Britain.
P.W. Ranby et al.; The investigation of new phosphors, with particular reference to the pyrophosphates; British Journal of Applied Physics; 9 pages.
V.B. Mikhailik; VUV sensitization of Mn2+ emission by Tb3+ in strontium aluminate phosphor; Materials Letters 63 (2009) 803-805.
Search Report and Written Opinion from corresponding PCT Application No. PCT/US2012/062014 dated Feb. 11, 2013.

* cited by examiner

*Primary Examiner* — Anne Hines
(74) *Attorney, Agent, or Firm* — Mary Louise Stanford

(57) ABSTRACT

A phosphor blend suitable for use in a fluorescent lamp for emitting white light is disclosed. The phosphor blend includes a first phosphor, a second phosphor and a third phosphor. The first phosphor is selected from a europium doped barium magnesium aluminate, a europium doped strontium aluminate, and a combination thereof; and the second phosphor has formula $Y_2O_3:Eu^{3+}$. The third phosphor is selected from a phosphor of formula I: $(A_{1-x}Mn_x)E_4O_7$, a phosphor of formula II: $(L_{1-y-z}M_yMn_z)_2P_2O_7$, and a combination thereof, where $0<x\leq0.10$, $0<y\leq0.20$, $0<z\leq0.10$; A is Ca, Ba, Sr, Zn, Mg, or a combination thereof; E is Ga, Al, In, or a combination thereof; L is Ca, Ba, Sr, Zn, Mg, Na, or a combination thereof; and M is at least one of Sn, and Ce. A fluorescent lamp including such phosphor blend is also disclosed.

18 Claims, 2 Drawing Sheets

PHOSPHOR BLENDS FOR FLUORESCENT LAMPS

BACKGROUND

The invention relates generally to phosphor blends for wavelength conversion, and specifically phosphor blends for use in fluorescent lamps. More particularly, the invention relates to phosphor blends for use in a fluorescent lamp, and a fluorescent lamp employing the same.

A fluorescent lamp typically has a transparent glass envelope enclosing a sealed discharge space containing an inert gas and mercury vapor. When subjected to a current provided by electrodes, the mercury ionizes to produce radiation having primary wavelengths of 185 nm and 254 nm. This ultraviolet radiation, in turn, excites phosphors on the inside surface of the envelope to produce visible light which is emitted through the glass.

Generally, a fluorescent lamp for illumination uses a phosphor which absorbs the radiation generated by mercury discharge, with the wavelengths 185 nm and 254 nm, and is activated so as to convert the radiation into visible light. In some conventional fluorescent lamps, a white-emitting calcium halophosphate phosphor, such as $Ca_{10}(PO_4)_6(F, Cl)_2$:Sb,Mn, has been used. However, in order to improve the color-rendering properties and emission output of white light, a three-band type fluorescent lamp is provided which employs the proper mixture (or blend) of red, green and blue-emitting phosphors, whose emission spectrum occupies a relatively narrow band. The phosphor blend converts the most part of the radiation generated by the lamp into visible light. In such a three-band type phosphor lamp, the emitting colors of the respective phosphors are considerably different from one another. Therefore, if the emitting intensity of any of the three corresponding phosphors is decreased, color deviation occurs, degrading the color-rendering properties of the lamp.

The highest efficiency is currently obtained with phosphors containing rare earths (or rare earth-activated phosphors). The phosphor's emission in the green spectral is essentially obtained due to the terbium (Tb) emission, and red due to europium (Eu) emission. However, rare earth, especially terbium is an expensive material; it increases the cost of the phosphor blend, and therefore the cost of a discharge lamp.

Therefore, it would be desirable to provide new and improved phosphor blends for white light emission.

BRIEF DESCRIPTION

Briefly, in one aspect, the present invention relates to a phosphor blend suitable for use in a fluorescent lamp. The phosphor blend includes a first phosphor, a second phosphor and a third phosphor. The first phosphor is selected from a europium doped barium magnesium aluminate, a europium doped strontium aluminate, and a combination thereof; and the second phosphor has formula $Y_2O_3$:$Eu^{3+}$. The third phosphor is selected from a phosphor of formula I: $(A_{1-x}Mn_x)E_4O_7$, a phosphor of formula II: $(L_{1-y}M_y)_2P_2O_7$, and a combination thereof, where $0 < x \leqq 0.10$, $0 < y \leqq 0.20$; A is Ca, Ba, Sr, Zn, Mg, or a combination thereof; E is Ga, Al, In, or a combination thereof; L is Ca, Ba, Sr, Zn, Mg, Na, or a combination thereof; and M is at least two of Mn, Sn, and Ce.

In another aspect, the present invention relates to a fluorescent lamp including the phosphor blend as mentioned above, and described in further detail in this document.

DRAWINGS

These and other features, aspects, and advantages of the present invention will become better understood when the following detailed description is read with reference to the accompanying drawing, wherein.

DETAILED DESCRIPTION

Figure 1:
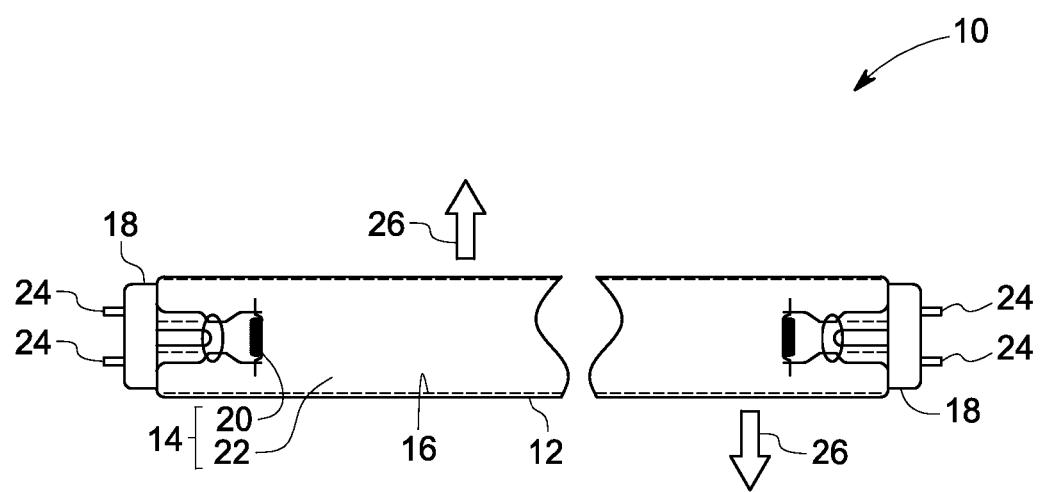
FIG. 1 is a schematic cross sectional view of a fluorescent lamp according to one embodiment of the invention.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

In the following specification and the claims that follow, the singular forms "a", "an" and "the" include plural referents unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances, an event or capacity can be expected, while in other circumstances the event or capacity cannot occur—this distinction is captured by the terms "may" and "may be".

The terms "first," "second," and the like, herein do not denote any order, quantity, or importance, but rather are used to distinguish one element from another.

As used herein, the term "phosphor" or "phosphor material" or "phosphor composition" may be used to denote both a single phosphor composition as well as a blend of two or more phosphor compositions. The phosphor blend may contain more than one phosphor compositions of blue, red, yellow, orange and green phosphors. The blue, red, yellow, orange and green phosphors are so called or known after the color of their light emission.

As used herein, the terms "substitution" and "doping" refer to adding an amount of an element in a material. It should be noted that various phosphors described herein may be written down by enclosing different elements in parentheses and separated by commas to show substitution or doping, such as in the case of $(Ca,Zn,Mn)Ga_4O_7$. As understood by those skilled in the art, this type of notation means that the phosphor can include any or all of those specified elements in the formulation in any ratio. That is, this type of notation for the above phosphor, for example, has the same meaning as $(Ca_{1-x-w}Zn_wMn_x)Ga_4O_7$, where $0 < x \leqq 0.1$ and $0 < w \leqq 0.10$. The phosphor may also be represented as $(Ca_{1-w}Zn_w)Ga_4O_7$:$Mn^{2+}$.

Embodiments of the present invention provide a phosphor blend that may be used in fluorescent lamps to generate white light suitable for general illumination and other purposes. The phosphor blend includes a first phosphor that produces blue and/or blue-green emissions having a peak emission wavelength between 430 nm and 550 nm. The first phosphor is a europium-activated barium magnesium aluminate (BAM), a europium-activated strontium aluminate (SAE), or a combination thereof.

BAM is a well-known blue-emitting phosphor for fluorescent lamps. The BAM phosphor may be of formula $BaMgAl_{10}O_{17}$:$Eu^{2+}$, or $BaMg_2Al_{16}O_{27}$:$Eu^{2+}$. The BAM phosphor is advantageously used because of its color purity as well as high luminescence. Furthermore, the BAM phosphor may be additionally doped with an activator ion. The additional activator ion for the BAM may be manganese ($Mn^{2+}$). The first phosphor may be a Mn-doped BAM, for example $BaMgAl_{10}O_{17}$:$Eu^{2+}$, $Mn^{2+}$, or $BaMg_2Al_{16}O_{27}$:$Eu^{2+}$, $Mn^{2+}$. The SAE phosphor has the formula $Sr_4A_{14}O_{25}$:$Eu^{2+}$. A single phosphor or any combination having two or more members selected from the group consisting of the BAM phosphor and the SAE phosphor, may also be used The phosphor blend includes a second phosphor that is a red emitting phosphor, generally having a peak emission wavelength between about 610 nm and about 640 nm. The second phosphor may be a europium doped yttrium oxide (YEO) phosphor, in particular $Y_2O_3$:$Eu^{3+}$.

The phosphor blend further includes a third phosphor that emits green and/or yellow-green emissions having a peak emission wavelength in a range from about 570 nanometers (nm) to about 680 nm. As alluded to previously, typically a terbium-activated phosphor composition is used for green light emissions. The invention provides an alternate green, yellow-green, or green-blue emitting phosphor that does not contain terbium, and is suitable to be used for white light emission for a fluorescent lamp.

The third phosphor may be a phosphor of formula I: $(A_{1-x}Mn_x)E_4O_7$, where $0<x\leq0.10$; A is Ca, Ba, Sr, Zn, Mg, or a combination thereof; E is Ga, Al, In, or a combination thereof. In certain embodiments, the third phosphor is a gallate of formula $(A_{1-x}Mn_x)Ga_4O_7$, where $0<x\leq0.10$; and A is Ca, Ba, Sr, Zn, Mg, or a combination thereof. The gallates of formula $(Ca_{1-x}Mn_x)Ga_4O_7$, where $0<x\leq0.10$, have a broad band yellow-green luminescence. A portion or all of the Ca may be substituted with Zn for tuning the emissions obtained from the gallate phosphor. Thus, in some specific embodiments, the third phosphor is $(Ca_{1-x-w}Zn_wMn_x)Ga_4O_7$, where $0<x\leq0.1$ and $0<w\leq0.10$.

The third phosphor may be a manganese doped alkaline earth pyrophosphate phosphor of formula (II): $(L_{1-y-z}M_yMn_z)_2P_2O_7$, where $0<y\leq0.20$, and $0<z\leq0.10$; L is Ca, Ba, Sr, Zn, Mg, Na, or a combination thereof; and M is at least one of Sn, and Ce. In certain embodiments, L comprises calcium. Other ions, for example Ba, Sr, Zn, Mg, Na, or a combination thereof, may be substituted for part of the calcium.

The luminescent properties can be influenced by the nature of the activators and co-activators, their concentrations, and the processing conditions. Activation of the manganese doped pyrophosphate of formula (II) by tin (Sn) or cerium (Ce) tailors the luminescence in the yellow-green or green or blue-green spectral regions, depending on the composition. In addition, specific substitution of strontium or sodium for calcium also influences the luminescent properties.

In some embodiments, the third phosphor is a tin and manganese doped calcium strontium pyrophosphate, $((Ca,Sr)_{1-y-z}Sn_yMn_z)_2P_2O_7$, where $0<y\leq0.20$, and $0<z\leq0.10$, which may also be written as $(Ca,Sr)_2P_2O_7$:$Mn^{2+}$, $Sn^{2+}$. In some embodiments, the third phosphor is a cerium and manganese doped calcium sodium pyrophosphate $((Ca,Na)_{1-y-z}Ce_yMn_z)_2P_2O_7$, where $0<y\leq0.20$, and $0<z\leq0.10$, which may also be written as $(Ca,Na)_2P_2O_7$:$Mn^{2+}$, $Ce^{2+}$.

The above described third phosphor is manganese ($Mn^{2+}$) doped, and provides broad band emissions in yellow-green or green or blue-green spectral regions. The $Mn^{2+}$ emission, in these phosphors has the potential of replacing phosphors, which are based on the emissions of trivalent terbium ion ($Tb^{3+}$) in fluorescent lamps. These phosphors of formula (I) and (II) are suitable for fluorescent lamps because these phosphors have high efficacy and high quantum efficiency for the absorption of the 254 nm radiations, and because these phosphors emit visible light having a peak emission wavelength between about 575 and 595 nm.

Table 1 further below, shows some of examples of the third phosphors which are used in some illustrative blend examples. A single phosphor or a combination of two or more members selected from the group consisting of pyrophosphate phosphor of formula II and the gallate phosphor of formula I may be used.

Each of the general formulas listed herein is independent of every other general formula listed. Specifically, x, y, z, a, b, and other variables that may be used as numeric placeholders in a formula are not related to any usage of x, y, z, a, b and other variables that may be found in other formulas or compositions.

The phosphors listed above are not intended to be limiting. Any other phosphor, commercial and non-commercial, that form non-reactive blends with the phosphor blends of the present techniques may be used in blends, and are to be considered to be within the scope of the present techniques. Furthermore, some additional phosphors may be used, e.g., those emitting throughout the visible spectrum region, at wavelengths substantially different from those of the phosphors described herein. These additional phosphors may be used in the blends to customize the white color of the resulting light, and to produce sources with improved light quality.

In some embodiments, an additional phosphor may be $LaPO_4$:$Ce^{3+}$, $Tb^{3+}$ (LAP), $CeMgAl_{11}O_{19}$:$Ce^{3+}$, $Tb^{3+}$ (CAT), $GdMgB_5O_{10}$:$Ce^{3+}$, $Tb^{3+}$ (CBT), $GdMgB_5O_{10}$:$Ce^{3+}$, $Mn^{2+}$ (CBM), $Mg_{28}Ge_{10}O_{48}$ (MFG), $YVO_4$:$Eu^{3+}$ (YVO), or a combination thereof. When the additional phosphor includes a phosphor composition containing terbium, the phosphor blend includes an amount terbium. However, the mass fraction of the additional phosphor composition containing terbium in the blend is relatively less than the mass fraction of each of the phosphor composition (the first, second and third phosphor) of the blend. Thus, the content of terbium in the overall blend is very less.

The phosphors used to make phosphor blends, may be produced by mixing powders of the constituent compounds and then firing the mixture under a reducing atmosphere. Typically, oxygen-containing compounds of the relevant metals are used. For example, the exemplary phosphor $(Ca,Sr)_2P_2O_7$:$Mn^{2+}$, $Sn^{2+}$, discussed further in the examples below, may be produced by mixing the appropriate amounts of oxygen-containing compounds of calcium, strontium, manganese, and tin, and then firing the mixture under a reducing atmosphere.

Non-limiting examples of suitable oxygen-containing compounds include oxides, hydroxides, alkoxides, phosphates, carbonates, nitrates, aluminates, silicates, citrates, oxalates, carboxylates, tartarates, stearates, nitrites, peroxides and combinations of these compounds. In embodiments containing carboxylates, the carboxylates used may generally have from one to five carbon atoms, such as formates, ethanoates, proprionates, butyrates, and pentanoates, although carboxylates having larger numbers of carbon atoms may be used.

The constituent compounds may be mixed together by any mechanical method. Such methods may include stirring or blending the powders in a high speed blender or a ribbon blender, or combining and pulverizing the powders in a ball mill, hammer mill, or jet mill. Any number of other techniques may also suitable for making a well-blended mixture of powders. If the mixture is wet, it may be dried first before being fired. The drying may be carried out at ambient atmosphere or under a vacuum.

The mixture of the constituent compounds for producing the phosphor may also comprise a flux, such as boric acid, lithium tetraborate, an alkali carbonate, an alkali phosphate, or a mixture of these compounds. The flux may aid in the phase formation of the intended phosphor and may also lower the firing temperature and/or time for the phosphor. If a flux is used, it may be desirable to wash the final phosphor product with a suitable solvent to remove any residual soluble impurities that may have originated from the flux.

After firing, the phosphor may be ball milled, or otherwise ground, to break up any conglomerates that may have formed during the firing procedure. The grinding may be performed after all firing steps are completed, or may be interspersed with additional firing steps. Although not intended to be limiting, in one embodiment, the average particle size of the phosphors may be from about 1 micron to about 15 microns.

Further, the constituent phosphors i.e. the first phosphor, the second phosphor and the third phosphor (discussed above) may be blended to form a phosphor blend. For example, phosphor blends may be made with the first phosphor having the general formulas $BaMgAl_{10}O_{17}:Eu^{2+}$, the second phosphor having the general formula $Y_2O_3:Eu^{2+}$, and the third phosphor of general formula $(Ca_{0.767}Sr_{0.1}Mn_{0.07}Sn_{0.063})_2P_2O_7$. An additional activator ion may be used in these phosphors to obtain the desired emission spectrum.

In addition to the synthesis procedures discussed above, many of the phosphors that may be used in the blends described herein may be commercially available. For example, BAM, BAMMn, YEO, LAP used in blend calculations in presently disclosed phosphor blends, may be commercially available.

One embodiment of the invention is directed to a fluorescent lamp that includes a phosphor blend. FIG. 1 is a perspective view of a fluorescent lamp 10, which may use the phosphor blend of the present technique. The lamp 10 may include an evacuated sealed housing 12, an excitation system 14 for generating UV radiation and is located within the housing 12, and a phosphor blend 16 disposed within the housing 12. End caps 18 are attached to either end of the housing 12 to seal the housing 12.

The excitation system 14 for generating the UV radiation may include an electron generator 20 for generating high-energy electrons and a fill gas 22 configured to absorb the energy of the high-energy electrons and emit UV light. For example, the fill gas 22 may include mercury vapor, which absorbs energy of the high-energy electrons and emits UV light. In addition to mercury vapor, the fill gas 22 may include a noble gas such as argon, krypton, and the like. The electron generator 20 may be a filament of a metal having a low work function (for example, less than 4.5 eV), such as tungsten, or a filament coated with alkaline earth metal oxides. Pins 24 may be provided to supply electrical power to the electron generator 20. The filament is coupled to a high-voltage source to generate electrons from the surface thereof.

In a typical fluorescent lamp, a phosphor composition or blend may be disposed on an inner surface of the housing 12. In some embodiments, the phosphor blend 16 may be applied as a coating on the inner surface. In some other embodiments, the coating of the phosphor blend 16 may be applied on the outside surface of the housing 12, or on a separate envelope containing the gas. Furthermore, in some embodiments, individual layers of the constituent phosphors may be applied one over another.

The phosphor blend 16 is radiationally coupled to the UV light from the excitation system 14. As used herein, the term "radiationally coupled" means that the elements (for example, a phosphor material and an UV light) are associated with each other so that at least part of the radiation emitted from one is transmitted to the other. A combination of light from the constituent phosphors may produce white light. Thus, a phosphor material that is radiationally coupled to the excitation system 14 may absorb radiation, such as the UV light emitted by the excitation system 14, and, in response, emit longer wavelengths, such as blue, blue-green, green, yellow, or red light. The longer wavelength of light may be visible as emitted light 26 transmitted through the housing 12. The housing 12 is generally made of a transparent material such as glass or quartz. Glass is commonly used as the housing 12 in fluorescent lamps, as the transmission spectrum of the glass may block a substantial portion of the "short wave" UV radiation, i.e., light having a wavelength of less than about 300 nm. Other appropriate transparent materials, such as plastics may also be used.

A particulate material, such as $TiO_2$ or $Al_2O_3$, may be used in conjunction with the phosphor blend 16 to diffuse light generated by the light source 10. Such a light scattering material may be included with the phosphor blend 16 or separately disposed as a layer between a surface of the housing 12 and the phosphor blend 16. For a fluorescent tube, it may be advantageous to have the median size of the particles of the scattering material range from about 10 nm to about 400 nm.

Although the lamp 10 shown in FIG. 1 has a straight housing 12, other housing shapes may be used. For example, a compact fluorescent lamp may have a housing 12 in a spiral shape, with electrical supply pins 24 that are disposed at one end of the lamp 10.

The light emitted from a fluorescent lamp may be characterized using any number of standard measurements. This characterization may normalize the data and make the comparison of light emitted by different lighting apparatus easier to determine. For example, the light from a fluorescent lamp provides a color point with corresponding color coordinates (ccx and ccy) in the CIE 1931 chromaticity diagram and correlated color temperature (CCT), and its spectral distribution provides a color rendering capability, measured by the color rendering index (CRI). The CRI is commonly defined as a mean value for 8 standard color samples (R1-8), usually referred to as the general Color Rendering Index, or Ra. A higher value for CRI produces a more "natural" appearance for illuminated objects. By definition, an incandescent light has a CRI of 100, while a typical compact fluorescent light may have a CRI of about 82. Further, the luminosity, or apparent brightness, of a source may also be determined from the spectrum of the emitted light. The luminosity is measured as lumens/W-opt, which represents the number of lumens that 1 watt of light having a particular spectral distribution would represent. A higher lumens/W-opt value indicates that a particular source would appear brighter to an observer.

When a phosphor material includes a blend of two or more phosphors, the ratio of each of the individual phosphors in the phosphor blend may vary, depending on the characteristics of the desired light output, for example color temperature. The relative amounts of each phosphor in the phosphor blend can be described in terms of spectral weight. The spectral weight is the relative amount that each phosphor contributes to the overall emission spectrum of the device. The spectral weight amounts of all the individual phosphors and any residual bleed from the source (e.g., lamp) should add up to 100%. The relative proportions of each constituent phosphor in the phosphor blends may be adjusted, so that when their emissions are blended and employed in a fluorescent lamp, there is produced visible light of predetermined ccx and ccy values with a correlated color temperature (CCT). As stated, a white light is preferably produced.

In some embodiments, each of the above described phosphors in the blend may have a spectral weight ranging from about 1 percent to about 70 percent. In some specific embodiments, the spectral weight of the first phosphor is preferably ranging from about 5 percent to about 30 percent. The spectral weights of the second phosphor and the third phosphor may range from about 30 percent to about 50 percent.

By use of the present invention, particularly the blends described herein, a lamp can be provided having high luminosity and general CRI values greater than about 85, for a low range of color temperatures of interest (about 2500 K to about 4000 K) for general illumination. In some blends, the CRI values approach the theoretical maximum of 100. In addition, the $R_9$ value for these blends can exceed about 90 and approach the theoretical maximum as well. Table 1 and Table 2 show luminosity, CRI values and $R_9$ values of various blends at CCT values 2700K and 3000K, respectively.

Thus, most of the embodiments of the present invention provide white light emitting fluorescent lamps or compact fluorescent lamps, which contain no terbium component or a significantly reduced terbium component. The lamp can thus be produced economically, with good energy efficiency and increased color rendering.

EXAMPLES

The examples that follow are merely illustrative, and should not be construed to be any sort of limitation on the scope of the claimed invention.

Figure 2:
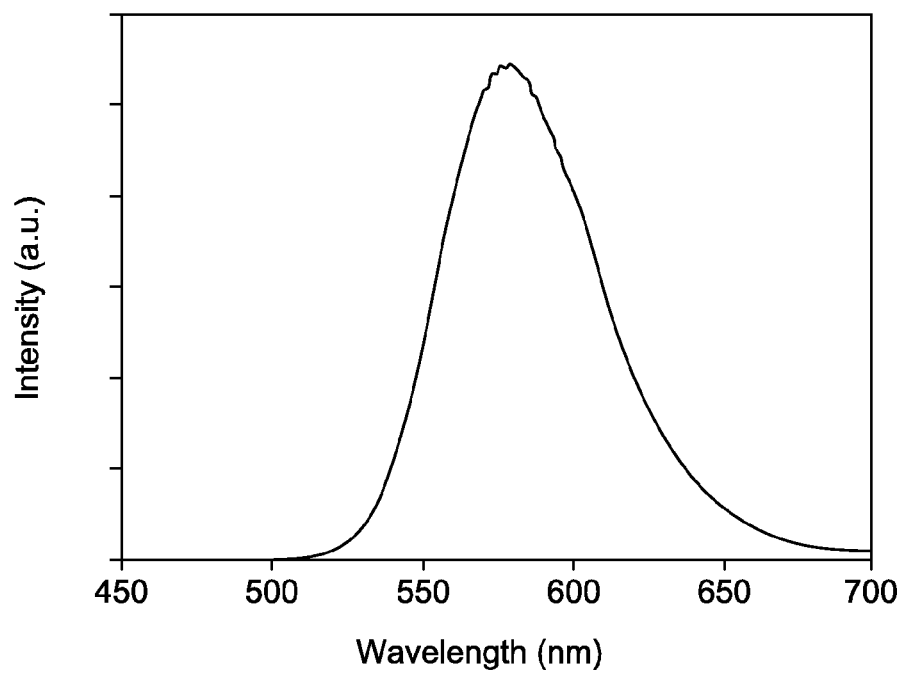
FIG. 2 shows the emission spectra of a third phosphor, in accordance with an embodiment of the invention.
Figure 3:
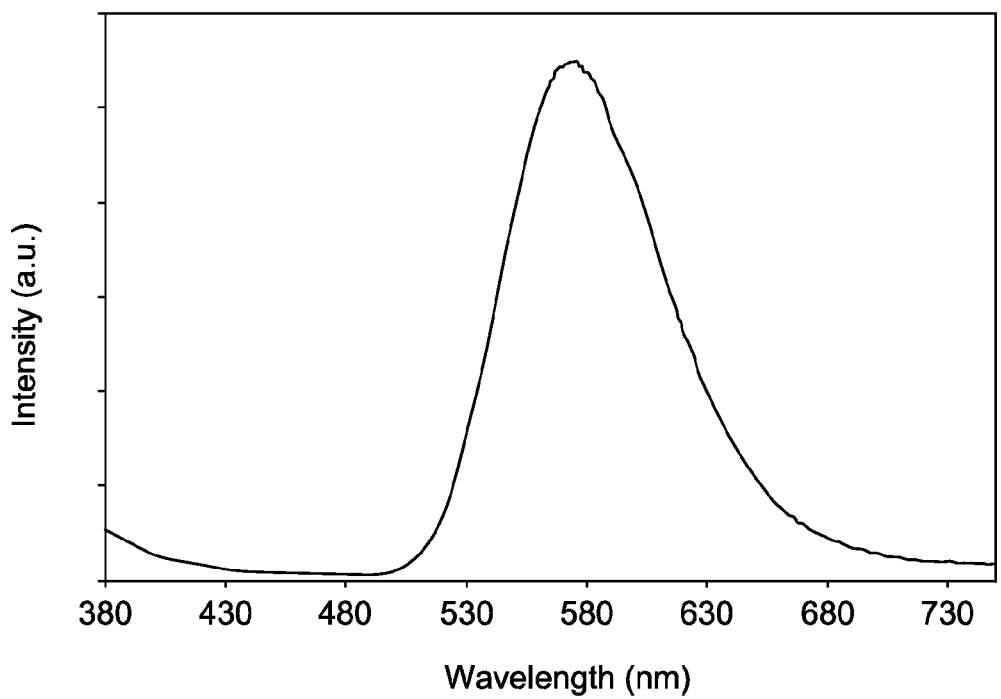
FIG. 3 shows the emission spectra of a third phosphor, in accordance with another embodiment of the invention.

Three phosphor compositions CGO, CPP1, and CPP2 given in Table 1 were synthesized. The chemical components used to produce each of the phosphor compositions are shown in Table 2. The amounts of the listed components were mixed as powders. The synthesis process as described below was used to produce each of the phosphor compositions. FIGS. 2 and 3 show the emission spectra of CGO and CPP1, respectively.

A mixture of chemical components was first ball milled for about one hour along with zirconia media. After milling, the powder was transferred to an alumina crucible and fired at about 1000 degrees Celcius for about 5 hrs in $N_2$—$H_2O$ atmosphere. After firing the powder was ground in a mortar and pestle, and put through a 60 mesh sieve. The powder was then milled to a particle size of around 10-12 microns, and re-fired at 900 degrees Celsius for about 5 hrs in $N_2$—$H_2O$ atmosphere. The powder was then re-ground in a mortar and pestle, and put back through a 60 mesh sieve. The powder was then placed into a 250 ml Nalgene bottle with 225 grams of ¼" zirconia media and milled for about 5 minutes to achieve about 10-12 microns $D_{50}$ PSD. After the particle size was measured the powder was filtered and dried.

TABLE 1

Formulas of the third phosphor used in the phosphor blends

| Name | Formula | QE/ABS |
|---|---|---|
| Gallate (CGO) | $(Ca_{0.89}Zn_{0.1}Mn_{0.01})Ga_4O_7$ | 83/91 |
| Pyrophosphate (CPP1) | $(Ca_{0.767}Sr_{0.1}Mn_{0.07}Sn_{0.063})_2P_2O_7$ | 97/77 |
| Pyrophosphate (CPP2) | $(Ca_{0.804}Na_{0.063}Mn_{0.07}Ce_{0.063})_2P_2O_7$ | 87/91 |

TABLE 2

Summary of phosphor components used in synthesis

| | CPP1 (grams) | CPP2 (grams) | CGO (grams) |
|---|---|---|---|
| $CaHPO_4$ | 3.7866 | 4.1027 | — |
| $SrHPO_4$ | 0.6662 | — | — |
| $Na_2HPO_4$ | — | 0.1677 | — |
| $MnCO_3$ | 0.2920 | 0.3018 | — |
| $SnO$ | 0.3079 | — | — |
| $CeO_2$ | — | 0.4067 | — |
| $(NH_4)_2HPO_4$ (DAP) | 0.8769 | 1.0624 | — |
| $CaCO_3$ | — | — | 1.0271 |
| $ZnO$ | — | — | 0.0938 |
| $Ga_2O_3$ | — | — | 4.3224 |

Examples of phosphor blends A-H (Table 3) including CPP1 were prepared. Other phosphors used in blends were $BaMgAl_{10}O_{17}:Eu^{2+}$ (BAM), $BaMgAl_{10}O_{17}:Eu^{2+}$, $Mn^{2+}$ (BAMn), $Y_{1.9}Eu_{0.1}O_3$ (YEO), and LAP. Most of these were commercially available phosphors. It should be noted that the precise concentrations of the constituent phosphors used in a blend depend on the absolute quantum efficiency of the constituent phosphors. Since the efficiency of individual phosphors may vary widely, the amounts of each constituent phosphor needed are best determined empirically, such as through standard design of experiment (DOE) techniques, or other experimental techniques known in the art. Table 3 shows the amount of each constituent phosphor based on its spectral weight, in the blends A-H.

TABLE 3

| Constituent phosphor | Phosphor blend | | | | | | | |
|---|---|---|---|---|---|---|---|---|
| | A | B | C | D | E | F | G | H |
| YEO | 36 | 36.8 | 38.8 | 33.9 | 41.8 | 40.3 | 39.2 | 40.4 |
| LAP | 0 | 0 | 0 | 0 | 10.9 | 11.2 | 13.4 | 12.5 |
| CPP1 | 42.2 | 39.4 | 39.4 | 44 | 28.9 | 29 | 29 | 29 |
| BAM | 4.9 | 5.6 | 4.9 | 5 | 6.2 | 6.6 | 6.2 | 6 |
| BAMn | 16.9 | 18.2 | 16.9 | 17.1 | 12.3 | 12.9 | 12.3 | 12 |

Respective lamps A-H were prepared using each of the blends A-H. In the coating procedure, the blend powder was dispersed in a water based system (which may contain other additives as are known in the art, including adherence promoters such as hydroxyethylcellulose or fine non-luminescent particles of alumina) optionally with a dispersing agent as known in the art. A thickener may also be added, typically polyethylene oxide. The suspension was then typically diluted with deionized water until it was suitable for producing a coating of the desired thickness or coating weight. The phosphor blend suspension was then applied as a coating to the inside of the glass tube (preferably by pouring the suspension down the inside of a vertically-held tube or pumping the suspension up into same) and heated by forced air until dry, as is known in the art. After the first thin coat or layer was applied, additionally desired thin coats or layers may be applied in the same manner, carefully drying each coat before the next coat was applied. Typically, the thin layers are built up until the total or cumulative coating thickness is sufficient to absorb substantially all of the UV light produced by the arc.

Lamps A-H were tested for their spectral characteristics. The target color was 4100K in this test. Table 4 shows spectral characteristics: color rendering index (CRI), correlated color temperature (CCT), luminosity-lumen per watt (LPW), and ccx and ccy. These lamps generated white light having a high CRI, good luminosity and a tunable CCT, e.g. from 2700K to 7000K.

TABLE 4

Spectral characteristics of lamps using example blends

| Lamp | ccx | ccy | CRI | CCT | Lamp LPW |
|---|---|---|---|---|---|
| A | 0.3903 | 0.3902 | 87.3 | 3844 | 70.2 |
| B | 0.3813 | 0.3871 | 87.0 | 4051 | 70.3 |
| C | 0.3947 | 0.3873 | 85.9 | 3716 | 70.0 |
| D | 0.3838 | 0.3926 | 88.3 | 4025 | 70.0 |
| E | 0.3888 | 0.3923 | 88.5 | 3898 | 76.7 |
| F | 0.3808 | 0.3925 | 88.3 | 4099 | 76.9 |
| G | 0.3830 | 0.3982 | 87.5 | 4082 | 78.1 |
| H | 0.3862 | 0.3970 | 87.8 | 3994 | 77.8 |

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A fluorescent lamp for emitting white light, comprising a phosphor blend, the phosphor blend comprising:
   a first phosphor selected from a europium doped barium magnesium aluminate, a europium doped strontium aluminate, and a combination thereof;
   a second phosphor of formula $Y_2O_3:Eu^{3+}$; and
   a third phosphor selected from a phosphor of formula I: $(A_{1-x}Mn_x)E_4O_7$, a phosphor of formula II: $(L_{1-y-z}M_yMn_z)_2P_2O_7$, and a combination thereof; wherein $0 < x \leq 0.10$, $0 < y \leq 0.20$, $0 < z \leq 0.10$;
   A is Ca, Ba, Sr, Zn, Mg, or a combination thereof;
   E is Ga, Al, In, or a combination thereof;
   L is Ca, Ba, Sr, Zn, Mg, Na, or a combination thereof; and
   M is at least one of Sn, and Ce.

2. The fluorescent lamp of claim 1, further comprising a glass envelope and the phosphor blend is deposited on an interior surface of the glass envelope.

3. The fluorescent lamp of claim 1, has color rendering index (CRI) greater than about 85 at a correlated color temperature (CCT) between about 2700K and about 10000K.

4. The fluorescent lamp of claim 1, has a luminous efficiency greater than about 70 Lumen/Watt.

5. A phosphor blend suitable for use in a fluorescent lamp comprising:
   a first phosphor selected from a europium doped barium magnesium aluminate, a europium doped strontium aluminate, and a combination thereof;
   a second phosphor of formula $Y_2O_3:Eu^{3+}$; and
   a third phosphor selected from a phosphor of formula I: $(A_{1-x}Mn_x)E_4O_7$, a phosphor of formula II: $(L_{1-y-z}M_yMn_z)_2P_2O_7$, and a combination thereof; wherein $0 < x \leq 0.10$, $0 < y \leq 0.20$, $0 < z \leq 0.10$;
   A is Ca, Ba, Sr, Zn, Mg, or a combination thereof;
   E is Ga, Al, In, or a combination thereof;
   L is Ca, Ba, Sr, Zn, Mg, Na, or a combination thereof; and
   M is at least one of Sn, and Ce.

6. The phosphor blend of claim 5, comprising about 1 percent to about 70 percent of spectral weight of each of the first phosphor, the second phosphor and the third phosphor.

7. The phosphor blend of claim 5, comprising from about 5 percent to about 30 percent of spectral weight of the first phosphor.

8. The phosphor blend of claim 5, wherein the first phosphor additionally comprises manganese.

9. The phosphor blend of claim 5, wherein the first phosphor is selected from $BaMgAl_{10}O_{17}:Eu^{2+}$, $BaMgAl_{10}O_{17}:Eu^{2+},Mn^{2+}$, $BaMg_2Al_{16}O_{27}:Eu^{2+}$, $BaMg_2Al_{16}O_{27}:Eu^{2+},Mn^{2+}$, $Sr_4Al_{14}O_{25}:Eu^{2+}$, and a combination thereof.

10. The phosphor blend of claim 5, wherein the third phosphor is $(A_{1-x}Mn_x)Ga_4O_7$, wherein $0 < x \leq 0.10$; and A is Ca, Ba, Sr, Zn, Mg, or a combination thereof.

11. The phosphor blend of claim 5, wherein the third phosphor is $(Ca, Sr)_2P_2O_7:Mn^{2+}, Sn^{2+}$.

12. The phosphor blend of claim 5, wherein the third phosphor is $(Ca, Na)_2P_2O_7: Mn^{2+}, Ce^{2+}$.

13. The phosphor blend of claim 5, further comprising an additional phosphor selected from the group consisting of $LaPO_4:Ce^{3+}, Tb^{3+}$ (LAP), $CeMgAl_{11}O_{19}:Ce^{3+}, Tb^{3+}$ (CAT), $GdMgB_5O_{10}:Ce^{3+}, Tb^{3+}$ (CBT), $GdMgB_5O_{10}:Ce^{3+}, Mn^{2+}$ (CBM), $Mg_{28}Ge_{10}O_{48}$ (MFG), $YVO_4:Eu^{3+}$ (YVO), or a combination thereof.

14. The phosphor blend of claim 5, comprising $BaMgAl_{10}O_{17}:Eu^{2+}$, $Y_2O_3:Eu^{2+}$, and $(L_{1-y-z}M_yMn_z)_2P_2O_7$; wherein $0 < y \leq 0.20$, $0 < z \leq 0.10$; L is Ca, Ba, Sr, Zn, Mg, Na, or a combination thereof; and M is at least one of Sn, and Ce.

15. The phosphor blend of claim 14, further comprising $BaMgAl_{10}O_{17}:Eu^{2+}, Mn^{2+}$.

16. The phosphor blend of claim 5, comprising $BaMgAl_{10}O_{17}:Eu^{2+}$, $Y_2O_3:Eu^{2+}$, and $(A_{1-x}Mn_x)Ga_4O_7$, wherein $0 < x \leq 0.10$; and A is Ca, Sr, Zn, or a combination thereof.

17. A fluorescent lamp for emitting white light comprising a phosphor blend, the phosphor blend comprising:
   $BaMgAl_{10}O_{17}:Eu^{2+}$; $BaMgAl_{10}O_{17}:Eu^{2+}, Mn^{2+}$; $Y_2O_3:Eu^{3+}$, and $((Ca, Sr)_{1-y-z}Sn_yMn_z)_2P_2O_7$, where $0 < y \leq 0.20$, and $0 < z \leq 0.10$.

18. The fluorescent lamp of claim 17, further comprising $LaPO_4:Ce^{2+}, Tb^{2+}$ (LAP).

* * * * *